United States Patent
Alexander

(10) Patent No.: US 10,721,267 B1
(45) Date of Patent: Jul. 21, 2020

(54) SYSTEMS AND METHODS FOR DETECTING SYSTEM ATTACKS

(71) Applicant: Symantec Corporation, Mountain View, CA (US)

(72) Inventor: Christopher Alexander, Culver City, CA (US)

(73) Assignee: NortonLifeLock Inc., Tempe, AZ (US)

( * ) Notice: Subject to any disclaimer, the term of this patent is extended or adjusted under 35 U.S.C. 154(b) by 122 days.

(21) Appl. No.: 14/335,232

(22) Filed: Jul. 18, 2014

(51) Int. Cl.
*H04L 29/06* (2006.01)
*G06F 16/245* (2019.01)

(52) U.S. Cl.
CPC .......... *H04L 63/145* (2013.01); *G06F 16/245* (2019.01)

(58) Field of Classification Search
CPC ...................... H04L 63/145; G06F 17/30424
See application file for complete search history.

(56) References Cited

U.S. PATENT DOCUMENTS

| | | | | |
|---|---|---|---|---|
| 6,873,988 B2 * | 3/2005 | Herrmann | ........... | H04L 12/2856 |
| 6,957,348 B1 * | 10/2005 | Flowers | ................ | G06F 21/552 |
| | | | | 370/229 |
| 7,386,888 B2 * | 6/2008 | Liang | ...................... | G06F 21/56 |
| | | | | 713/188 |
| 7,669,207 B2 * | 2/2010 | Johnson | ........................ | 719/318 |
| 8,046,835 B2 * | 10/2011 | Herz | .................... | G06Q 20/201 |
| | | | | 726/25 |
| 8,087,085 B2 * | 12/2011 | Hu et al. | .......................... | 726/24 |
| 8,429,180 B1 * | 4/2013 | Sobel | ...................... | G06F 21/55 |
| | | | | 707/758 |
| 8,689,332 B2 * | 4/2014 | Kakie | .................... | G06F 21/566 |
| | | | | 713/153 |
| 8,898,784 B1 * | 11/2014 | Alexander | ............ | H04L 63/145 |
| | | | | 709/232 |
| 9,332,029 B1 * | 5/2016 | Tikhonov | .............. | H04L 63/145 |
| 2003/0159064 A1 * | 8/2003 | Takahashi | ............. | G06F 21/567 |
| | | | | 726/24 |
| 2004/0083129 A1 * | 4/2004 | Herz | .................... | G06Q 20/201 |
| | | | | 726/25 |
| 2004/0205419 A1 * | 10/2004 | Liang et al. | .................... | 714/57 |

(Continued)

OTHER PUBLICATIONS

Derwent Accession No. 2005-212718, Derwent Week 200840, Isolation method of infected client devices from uninfected client device in distributed network, involves monitoring data packets in network for virus, to identify and block only associated packet types.*

(Continued)

*Primary Examiner* — Mahfuzur Rahman
*Assistant Examiner* — Richard W Cruz-Franqui
(74) *Attorney, Agent, or Firm* — FisherBroyles, LLP

(57) ABSTRACT

The disclosed computer-implemented method for detecting system attacks may include (1) receiving, from a detecting system capable of detecting attacks, information that identifies an attack that originated from a compromised client system that is remote from the detecting system, (2) determining that the attack originated from the compromised client system, (3) determining that the compromised client system includes an anti-malware agent, and (4) notifying the anti-malware agent on the compromised client system that the compromised client system performed the attack. Various other methods, systems, and computer-readable media are also disclosed.

20 Claims, 6 Drawing Sheets

(56) References Cited

U.S. PATENT DOCUMENTS

| | | | |
|---|---|---|---|
| 2006/0070130 A1* | 3/2006 | Costea | G06F 21/552 726/24 |
| 2007/0136297 A1* | 6/2007 | Choe | H04L 67/34 |
| 2009/0119681 A1* | 5/2009 | Bhogal | G06F 21/554 719/318 |
| 2010/0205670 A1* | 8/2010 | Milliken | G06F 21/562 726/23 |
| 2011/0066841 A1* | 3/2011 | Goodrow et al. | 713/150 |
| 2014/0096253 A1* | 4/2014 | Garcia Morchon | H04W 12/06 726/23 |
| 2014/0237599 A1* | 8/2014 | Gertner | H04L 63/145 726/24 |
| 2014/0283065 A1* | 9/2014 | Teddy | H04L 63/145 726/23 |
| 2014/0380474 A1* | 12/2014 | Paithane | H04L 63/145 726/23 |
| 2015/0188934 A1* | 7/2015 | Vasseur | H04W 12/1205 726/23 |
| 2015/0256554 A1* | 9/2015 | Sakakibara | G06F 11/34 726/25 |

OTHER PUBLICATIONS

NPL Search (Innovation Q) (Year: 2020).*

* cited by examiner

SYSTEMS AND METHODS FOR DETECTING SYSTEM ATTACKS

BACKGROUND

The history of computer security may be viewed as a series of offensive maneuvers and defensive responses. As malware creators have devised new attacks, anti-malware system designers have responded with methods for detecting the attacks and protecting computing systems against them. The use of stealth strategies has made some forms of malware particularly difficult to defend against. Polymorphic malware, for example, does not have a fixed signature that can be detected using typical scanning methods.

Once malware gains a foothold in an organization by successfully infecting a computing system, other systems within the organization may be subject to repeated attacks until defenses on the systems are breached. Widespread infections of this type are typical of botnets, where covert software running on many computing systems carry out such malicious tasks as sending large quantities of spam email or conducting denial of service attacks.

Accordingly, the instant disclosure identifies and addresses a need for additional and improved systems and methods for detecting system attacks originating from compromised computing systems.

SUMMARY

As will be described in greater detail below, the instant disclosure describes various systems and methods for detecting system attacks by detecting an attack originating from a compromised system, identifying the system from which the attack originated, confirming that the compromised system includes an anti-malware agent, and notifying the anti-malware agent running on the compromised system of the malware infection. In this way, computing systems running cooperative anti-malware agents (e.g., computing systems with anti-malware agents from the same vendor) can cooperatively detect malware infections, even when the malware includes stealth features that prevent detection by the compromised system.

In one example, a computer-implemented method for detecting system attacks may include (1) receiving, from a detecting system capable of detecting attacks, information that identifies an attack that originated from a compromised client system that is remote from the detecting system, (2) determining that the attack originated from the compromised client system, (3) determining that the compromised client system includes an anti-malware agent, and (4) notifying the anti-malware agent on the compromised client system that the compromised client system performed the attack.

In one embodiment, information that identifies the attack may include information identifying a file suspected of including malware and/or information identifying a behavior suspected to be malicious. In some examples, determining that the attack originated from the compromised client system may include determining that the file suspected of including malware originated from the compromised client system and/or determining that the suspected malicious behavior originated from the compromised client system.

In some examples, the detecting system may identify the attack by (1) detecting malicious or unwanted network traffic (e.g., spam) from the compromised system, (2) detecting an attempt to exploit a known vulnerability of the detecting system, (3) detecting an unauthorized attempt to create a file on the detecting system, (4) detecting an unauthorized attempt to modify an existing file on the detecting system, (5) detecting an attempt to modify an executing process of the detecting system, (6) detecting an unauthorized attempt to modify a system configuration database on the detecting system, (7) detecting an unexpected attempt to execute a software program on the detecting system, (8) detecting an unauthorized attempt to access sensitive data on the detecting system, (9) detecting an attempt to bypass a security system of the detecting system, and/or (10) detecting an attempt to disable a security system of the detecting system.

In some examples, determining that the compromised client system includes the anti-malware agent may include querying the compromised client system to determine that the compromised client system includes the anti-malware agent and/or obtaining, by querying an anti-malware service that maintains a database of client systems that include the anti-malware agent, an indication that the compromised client system includes the anti-malware agent. In some examples, the detecting system may include a network gateway and/or an additional client system that includes an additional anti-malware agent (e.g., both the detecting system and the compromised system may be anti-malware clients).

In some examples, notifying the anti-malware agent on the compromised client system may include transmitting, to the anti-malware agent, at least one of (1) an indication that an attack originated from the compromised client system, (2) a category of attack that originated from the compromised client system, (3) information identifying malware that infected the compromised client system, (4) instructions for halting the attack originating from the compromised client system, (5) instructions for removing malware that infected the compromised client system, (6) instructions to perform an anti-malware scan (e.g., a deep or aggressive anti-malware scan), and/or (7) instructions for submitting a suspected malware file to the anti-malware service.

In some examples, the computer-implemented method may further include performing a security action, which may include (1) notifying an administrator that an attack originated from the compromised client system, (2) instructing an anti-malware agent on the detecting system to perform a malware scan on the detecting system, (3) instructing an anti-malware agent on an additional computing system (e.g., a computing system other than the detecting system) in communication with the compromised client system to perform a malware scan on the additional computing system, (4) obtaining, from the compromised client system, a file suspected of including malware to be analyzed, (5) identifying a network location where the attack on the compromised client system originated, and/or (6) blocking network communications from the network location where the attack on the compromised client system is originated.

In one embodiment, a system for implementing the above-described method may include several modules stored in memory, such as (1) a receiving module that receives, from a client system capable of detecting attacks, information that identifies an attack that originated from a compromised client system that is remote from the client system that identified the attack, (2) a location module that determines that the attack originated from the compromised client system, (3) a determination module that determines that the compromised client system includes an anti-malware agent, and (4) a notification module that notifies the anti-malware agent on the compromised client system that the compromised client system performed the attack. The system may also include one or more physical processors configured to execute the receiving module, the location module, the determination module, and the notification module.

In some examples, the above-described method may be encoded as computer-readable instructions on a non-transitory computer-readable medium. For example, a computer-readable medium may include one or more computer-executable instructions that, when executed by one or more processors of a computing device, may cause the computing device to (1) receive, from a client system capable of detecting attacks, information that identifies an attack that originated from a compromised client system that is remote from the client system that identified the attack, (2) determine that the attack originated from the compromised client system, (3) determine that the compromised client system includes an anti-malware agent, and (4) notify the anti-malware agent on the compromised client system that the compromised client system performed the attack.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
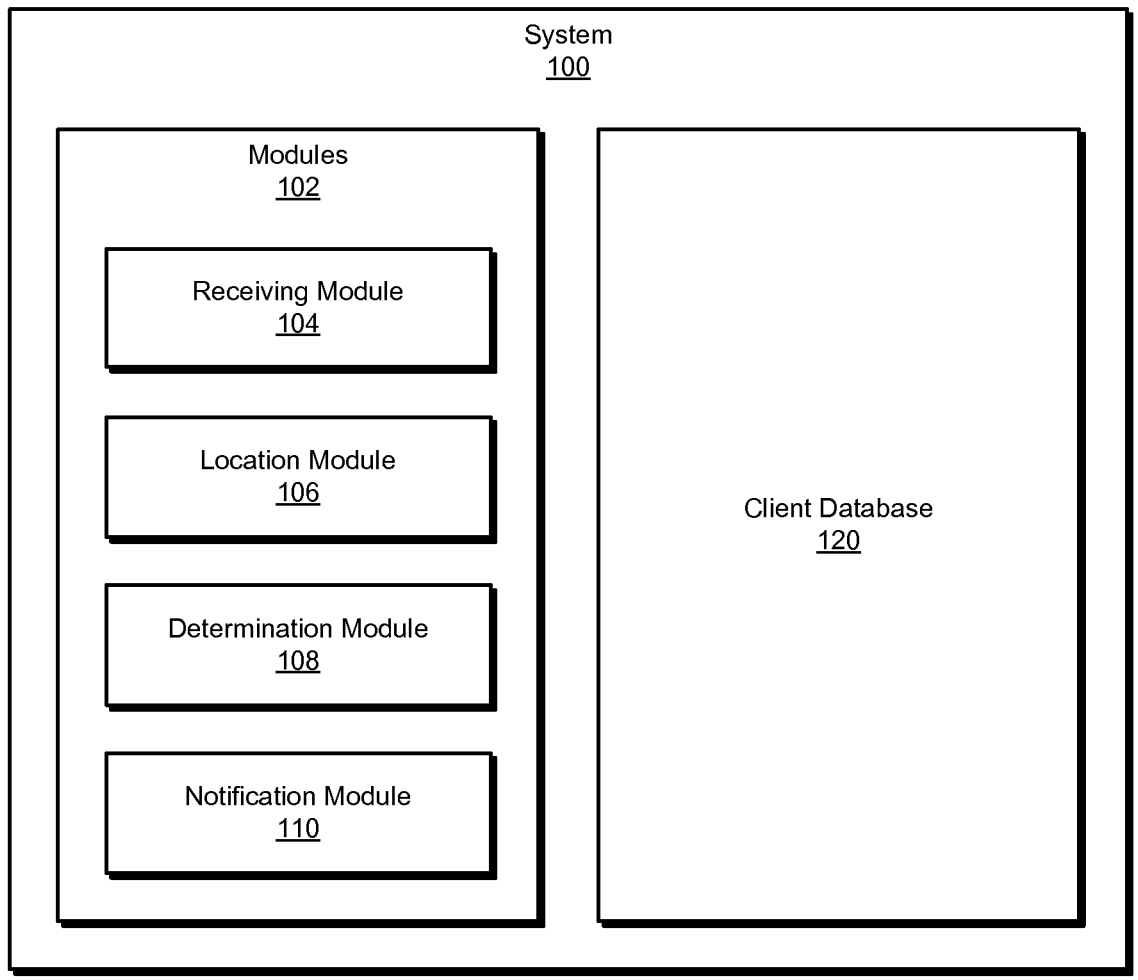
FIG. 1 is a block diagram of an exemplary system for detecting system attacks.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for detecting system attacks. As will be explained in greater detail below, the systems and methods described herein may cooperatively detect malware infections on computing systems running cooperative anti-malware agents. A computing system detecting an attack may determine the origin of the attack and notify the anti-malware agent running on the compromised system of the malware infection. For example, if both a compromised computing system and a system being attacked by the compromised computing system are running anti-malware agents from the same software vendor, the anti-malware agents may cooperatively detect and remediate malware on the compromised system that evaded detection (e.g., malware that was not detected during a normal malware scan).

Figure 2:
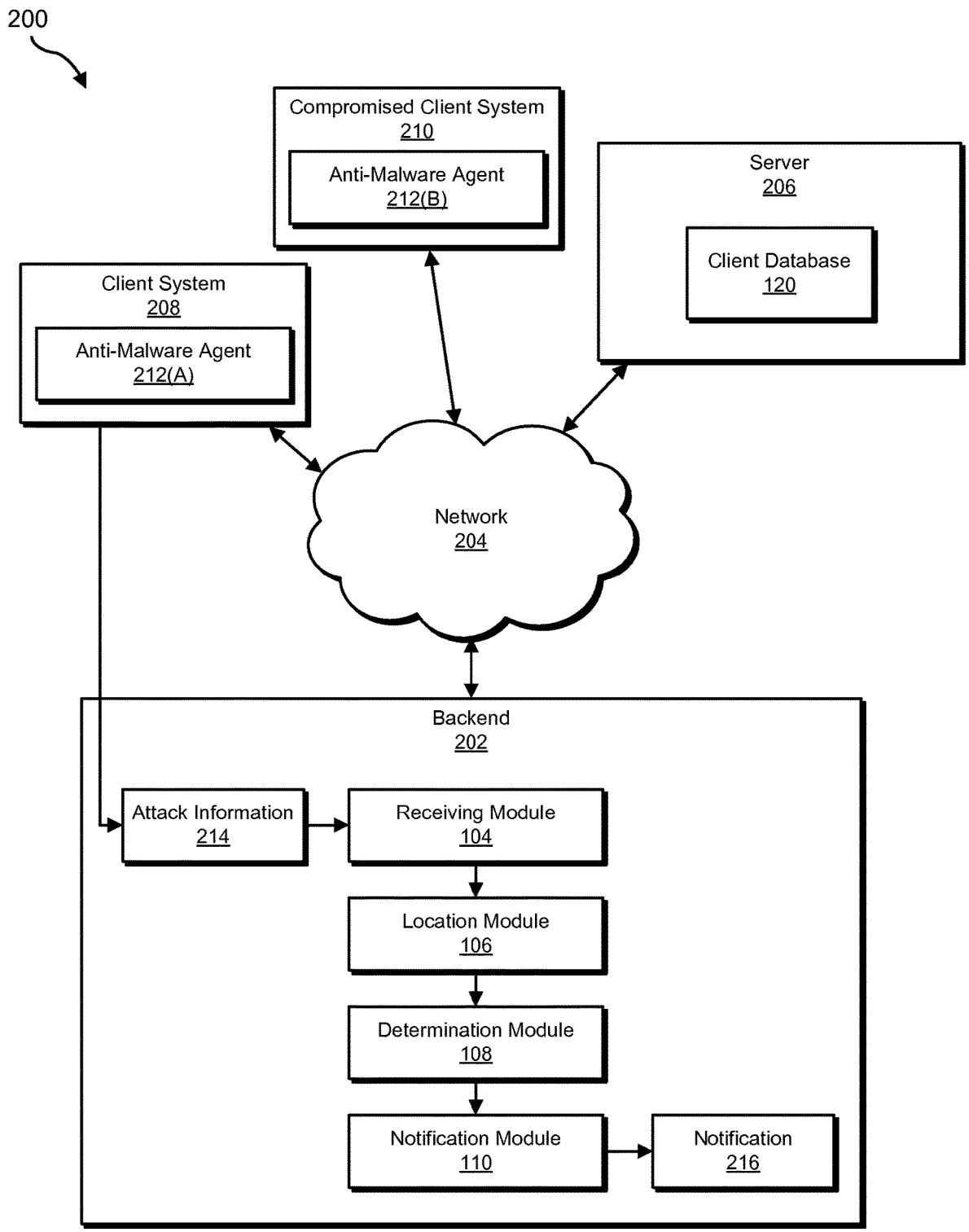
FIG. 2 is a block diagram of an additional exemplary system for detecting system attacks.
Figure 3:
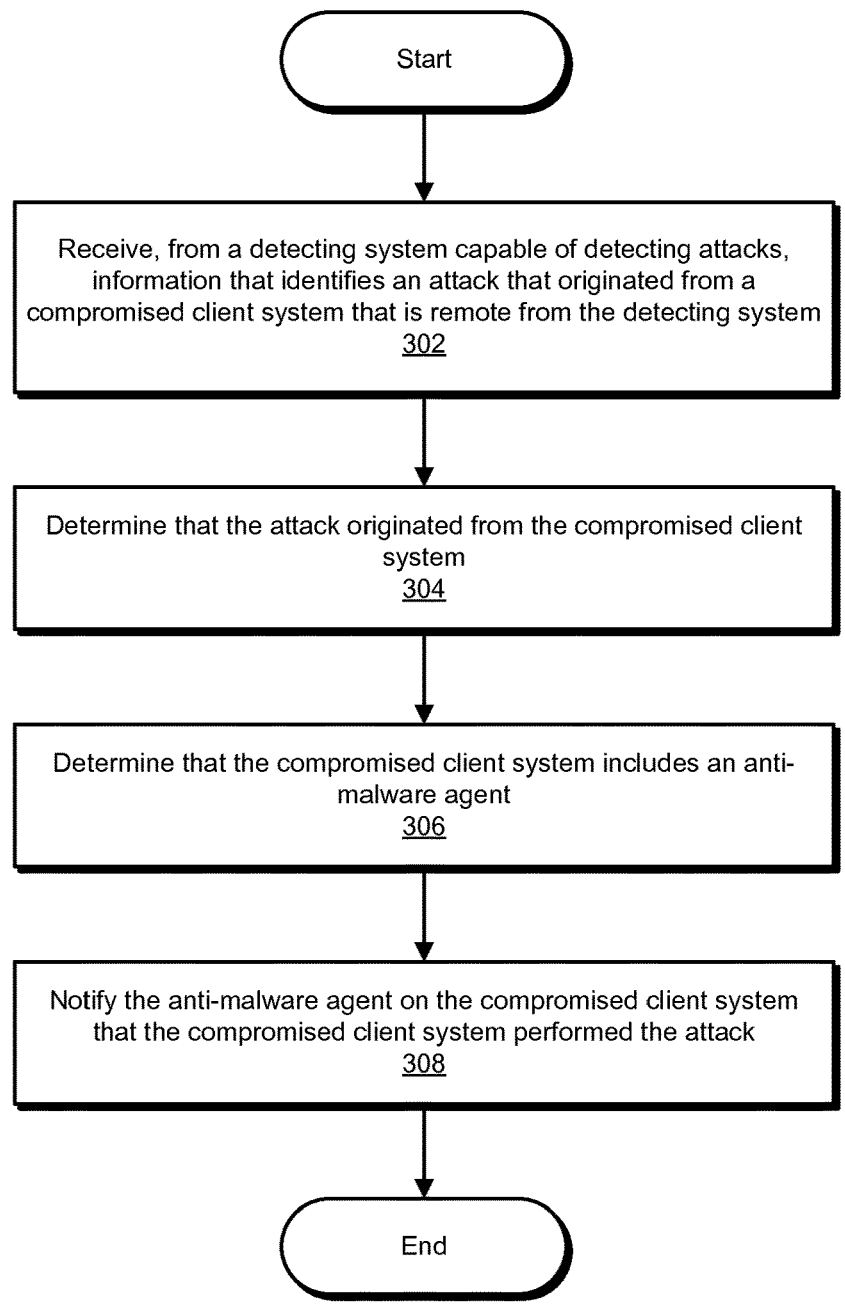
FIG. 3 is a flow diagram of an exemplary method for detecting system attacks.
Figure 4:
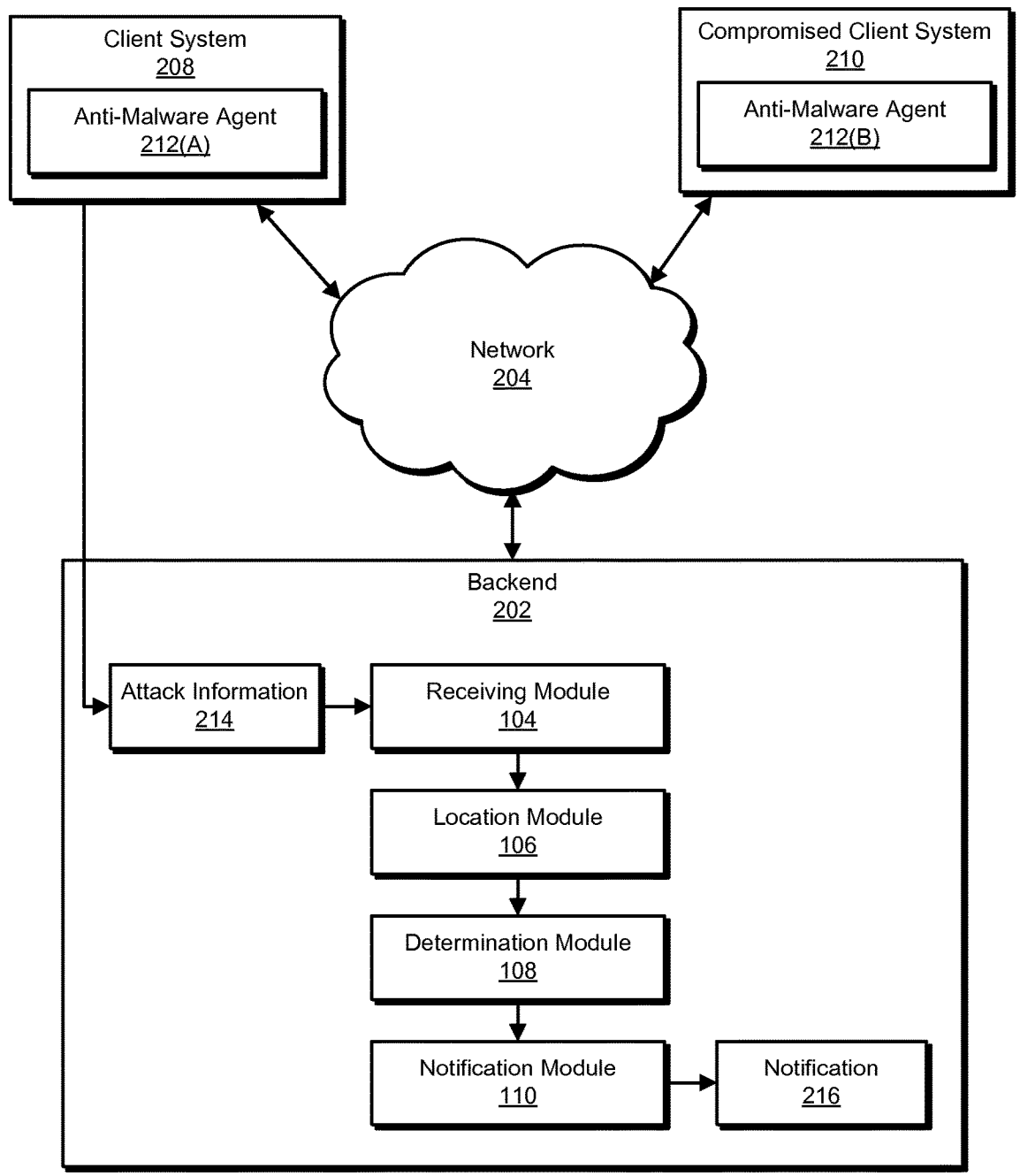
FIG. 4 is a block diagram of an exemplary peer-oriented system for detecting system attacks.

The following will provide, with reference to FIGS. 1, 2, and 4, detailed descriptions of exemplary systems for detecting system attacks. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of exemplary system 100 for detecting system attacks. As illustrated in this figure, exemplary system 100 may include one or more modules 102 for performing one or more tasks. For example, and as will be explained in greater detail below, exemplary system 100 may include a receiving module 104 that may receive, from a detecting system capable of detecting attacks, information that identifies an attack that originated from a compromised client system that may be remote from the detecting system. Exemplary system 100 may additionally include a location module 106 that may determine that the attack originated from the compromised client system. Exemplary system 100 may also include a determination module 108 that may determine that the compromised client system includes an anti-malware agent. Exemplary system 100 may additionally include a notification module 110 that may notify the anti-malware agent on the compromised client system that the compromised client system performed the attack. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., backend 202 and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as client database 120. In one example, client database 120 may be configured to store configuration information for client computing systems, indicating, for example, which client systems include anti-malware agents. Client database 120 may represent portions of a single database or computing device or a plurality of databases or computing devices. For example, client database 120 may represent a portion of backend 202 or server 206 in FIG. 2, computing system 510 in FIG. 5, and/or portions of exemplary network architecture 600 in FIG. 6. Alternatively, client database 120 in FIG. 1 may represent one or more physically separate devices capable of being accessed by a computing device, such as backend 202 or server 206 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include a backend 202 in communication with a server 206 via a network 204. In one example, backend 202 may be programmed with one or more of modules 102 and/or may store all or a portion of the data in client database 120. Additionally or alternatively, server 206 may be programmed with one or more of modules 102 and/or may store all or a portion of the data in client database 120.

In one embodiment, one or more of modules 102 from FIG. 1 may, when executed by one or more processors of backend 202 and/or server 206, enable backend 202 and/or server 206 to detect system attacks. For example, and as will be described in greater detail below, receiving module 104 may receive, from a client system 208 that is capable of detecting attacks, information that identifies an attack that originated from a compromised client system 210 that is remote from client system 208. Location module 106 may determine that the attack originated from compromised client system 210. Determination module 108 may determine that compromised client system 210 includes an anti-malware agent 212. Notification module 110 may notify anti-malware agent 212 on compromised client system 210 that compromised client system 210 performed the attack.

Backend 202 and server 206 generally represent any type or form of computing device that is capable of storing, comparing, and/or providing data. Examples of backend 202 and server 206 include, without limitation, application servers and database servers configured to provide various database services and/or run certain software applications. Backend 202 and/or server 206 may be implemented within a managed enterprise environment, as part of an anti-malware backend maintained by an anti-malware vendor, and/or in any other suitable manner.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between client systems 208 and 210, backend 202, and server 206.

While FIG. 2 shows client system 208 (i.e., the detecting system) as a peer computing device with compromised client system 210, in some embodiments the detecting system may be part of a network gateway through which compromised client system 210 sends traffic. The systems of FIG. 2 may also be implemented in any other suitable configuration.

FIG. 3 is a flow diagram of an exemplary computer-implemented method 300 for detecting system attacks. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may receive, from a client system capable of detecting attacks, information that identifies an attack that originated from a compromised client system that is remote from the client system that identified the attack. For example, at step 302 receiving module 104 may, as part of backend 202 in FIG. 2, receive, from a client system capable of detecting attacks, information that identifies an attack that originated from compromised client system 210 that is remote from the client system that identified the attack.

The term "attack," as used herein, generally refers to any unwanted attempt to control, exploit, or damage the resources of a computing system. Types of attacks include various forms of malware infections, spam, vulnerability exploits, data theft, and denial of service attacks. Although not depicted in FIG. 2, system 200 may include an identification module that identifies that an attack has occurred or is in progress. The identification module may be part of an anti-malware agent, such as anti-malware agent 212(A) on client system 208, or may be a module located on a separate computing system, such as backend 202 and/or a network gateway device.

In some examples, the identification module may identify the attack by detecting unexpected or unwanted network traffic. For example, the identification module may monitor network traffic for spam, potentially malicious data, and/or traffic that may attempt to exploit a vulnerability of an intended destination. In another example, an attack in progress may be identified by patterns of network traffic. Once a malware infection has established a foothold in a local network (e.g., an enterprise network), the malware may attempt to infect other systems via open network ports. Repeated unexpected attempts to communicate through network ports or use of unexpected network protocols may alert an anti-malware agent to an attack in progress.

As noted, the identification module may identify the attack by detecting an attempt to exploit a known vulnerability. For example, the identification module may detect an attempt to exploit a firewall vulnerability, a security system vulnerability, an operating system vulnerability, and/or any other type of vulnerability of a system being attacked.

The identification module may additionally or alternatively detect the attack by detecting suspicious and/or malicious activity on the system under attack (e.g., in situations where the attack has compromised and/or infected the system under attack). For example, the identification module may detect an unauthorized attempt to create a file, detect an unauthorized attempt to modify an existing file, detect an attempt to modify an executing process, detect an unauthorized attempt to modify a system configuration database, detect an unexpected attempt to execute a software program, detect an unauthorized attempt to access sensitive data, detect an attempt to bypass a security system, and/or detect an attempt to disable a security system.

Receiving module 104 may receive information identifying the attack in a variety of ways and contexts. For example, receiving module 104 may receive information identifying the attack from the identification module. In one embodiment, information that identifies the attack may include information identifying a file suspected of including malware and/or information identifying a behavior suspected to be malicious. The identification module may identify the compromised client system from which the attack originated and may include identification of the compromised system with other information identifying the attack.

As noted in the description of FIG. 2, receiving module 104 may be part of a security system backend and may receive information identifying the attack from a client system that detected the attack. Alternatively, receiving module 104 may be part of a client computer that detected the attack and may receive the information that identifies the attack from the security system (e.g., detection software) on the client computer that detected the attack.

Returning to FIG. 3, at step 304 one or more of the systems described herein may determine that the attack originated from the compromised client system. For example, at step 304, location module 106 may, as part of backend 202 in FIG. 2, determine that the attack originated from compromised client system 210.

Location module 106 may determine the origin of the attack in a variety of ways. For example, location module 106 may receive information identifying the origin of the attack from the module that determined that the attack occurred or was in progress. In some examples, location module 106 may determine that the attack originated from the compromised client system by determining that network traffic (e.g., a file) suspected of including malware originated from the compromised client system and/or by determining that the suspected malicious behavior originated from the compromised client system. Location module 106 may also determine the origin of the attack by identifying the client system from which subsequent attacks originate. In some examples, location module 106 may analyze network traffic to identify the origin of the attack. Location module 106 may use an IP address and/or other network data to identify the origin of the attack. Location module 106 may additionally or alternatively perform any other type of analysis to determine the origin of the attack.

At step 306 one or more of the systems described herein may determine that the compromised client system includes an anti-malware agent. For example, at step 306 determination module 108 may, as part of backend 202 in FIG. 2, determine that compromised client system 210 includes anti-malware agent 212(B).

Determination module 108 may determine that the compromised client system includes the anti-malware agent in a variety of ways. In some examples, determination module 108 may determine that the compromised client system includes the anti-malware agent by querying an anti-malware service that maintains a database of client systems that include the anti-malware agent and receiving an indication that the compromised client system includes the anti-malware agent.

Determination module 108 may also determine that the compromised client system includes the anti-malware agent by querying the compromised client system directly. Determination module 108 may use this approach in a situation where a database of client systems that include the anti-malware agent is not available, such as in a local network without a database server, or situations where the server hosting the database is not running.

FIG. 4 is an exemplary peer-oriented system 400 for detecting system attacks. Exemplary system 400 includes all of the components of exemplary system 200 shown in FIG. 2, except for server 206, which hosts client database 120. In peer-oriented system 400, anti-malware agent 212(A) running on client system 208 may determine that anti-malware agent 212(B) is running on compromised client system 210 by querying anti-malware agent 212(B) directly. Furthermore, in some situations, all or a portion of the functionality provided by modules 102 may be performed by anti-malware agent 212(A). In such situations, backend 202 may not be necessary at all (e.g., modules 102 may be located on client system 208) or may provide limited functionality in detecting and handling system attacks.

At step 308 one or more of the systems described herein may notify the anti-malware agent on the compromised client system that the compromised client system performed the attack. For example, at step 308 notification module 110 may, as part of backend 202 in FIG. 2, notify anti-malware agent 212(B) on compromised client system 210 that the attack originated from compromised client system 210.

Notification module 110 may notify the anti-malware agent on the compromised client system in a variety of ways. For example, notification module 110 may notify the anti-malware agent on the compromised client system that an attack is in progress or has occurred and may provide the anti-malware client with information about the attack. For example, notification module 100 may transmit, to the anti-malware agent, an indication that an attack originated from the compromised client system, a category of attack that originated from the compromised client system, and/or information identifying malware believed to have infected the compromised client system. The anti-malware agent may use this information, for example, to halt the attack and repair any associated damage to the compromised system.

In some examples, the anti-malware agent on the compromised system may not have information required to stop the attack and remediate its effects. In such cases, notification module 110 may provide the anti-malware agent on the compromised system instructions for stopping the attack originating from the compromised client system, instructions for removing malware believed to have infected the compromised client system, and/or instructions to perform an anti-malware scan (e.g., an aggressive anti-malware scan, since the malware may have evaded a normal malware scan of the compromised client system). An aggressive anti-malware scan (sometimes referred to as a deep scan) may be more tolerant of false positive results or better targeted to the variety of malware detected. Notification module 110 may also provide the anti-malware agent with instructions for submitting a suspected malware file to an anti-malware service for further analysis.

In some examples, system 200 may include a security module that performs a security action in response to identifying the attack. For example, the security action may include notifying an administrator that an attack originated from the compromised client system. An administrator may initiate a more comprehensive analysis of the attack and take measures to prevent future attacks. A security action may also gather information about the attack beyond the information obtained when the attack was initially detected. For example, the security module may obtain, from the compromised client system, a file suspected of including malware to be analyzed and/or may identify a network location where the attack on the compromised client system is believed to have originated.

In other examples, the security module may perform one or more security actions intended to prevent further spread of the malware infection or additional infections while additional security actions are undertaken. For example, the security module may block network communications from the network location where the attack on the compromised client system is believed to have originated and/or may initiate close monitoring of network communications.

In other examples, the security module may perform one or more security actions intended to determine whether other computing systems in communication with the compromised systems have also been compromised. For example, the security module may transmit instructions to the anti-malware agent on the computing system that detected the attack to perform an aggressive malware scan. The security module may also identify other systems in communication with the compromised system (for example, by analyzing network records or identifying computing systems on the same network segment) and instruct anti-malware agents on these systems to perform aggressive malware scans.

As described above, the systems and methods described herein may detect system attacks on computing systems running anti-malware agents, even when malware has successfully attacked and compromised a computing system and avoided detection. For example, two computing systems may both be running anti-malware agents from the same vendor (or may be running anti-malware agents that are able to communicate or cooperate with each other). Systems and methods described herein may cooperatively identify the origin and nature of an attack and then determine and initiate the appropriate response. Systems and methods described herein may be implemented using a client-server architecture, with the server-side functionality performed by a remote server and/or a network gateway, or in a distributed architecture, where each client is capable of detecting an attack, locating the origin of the attack, querying the compromised system to determine whether it includes the anti-malware agent, and notifying the compromised system of the malware infection.

Figure 5:
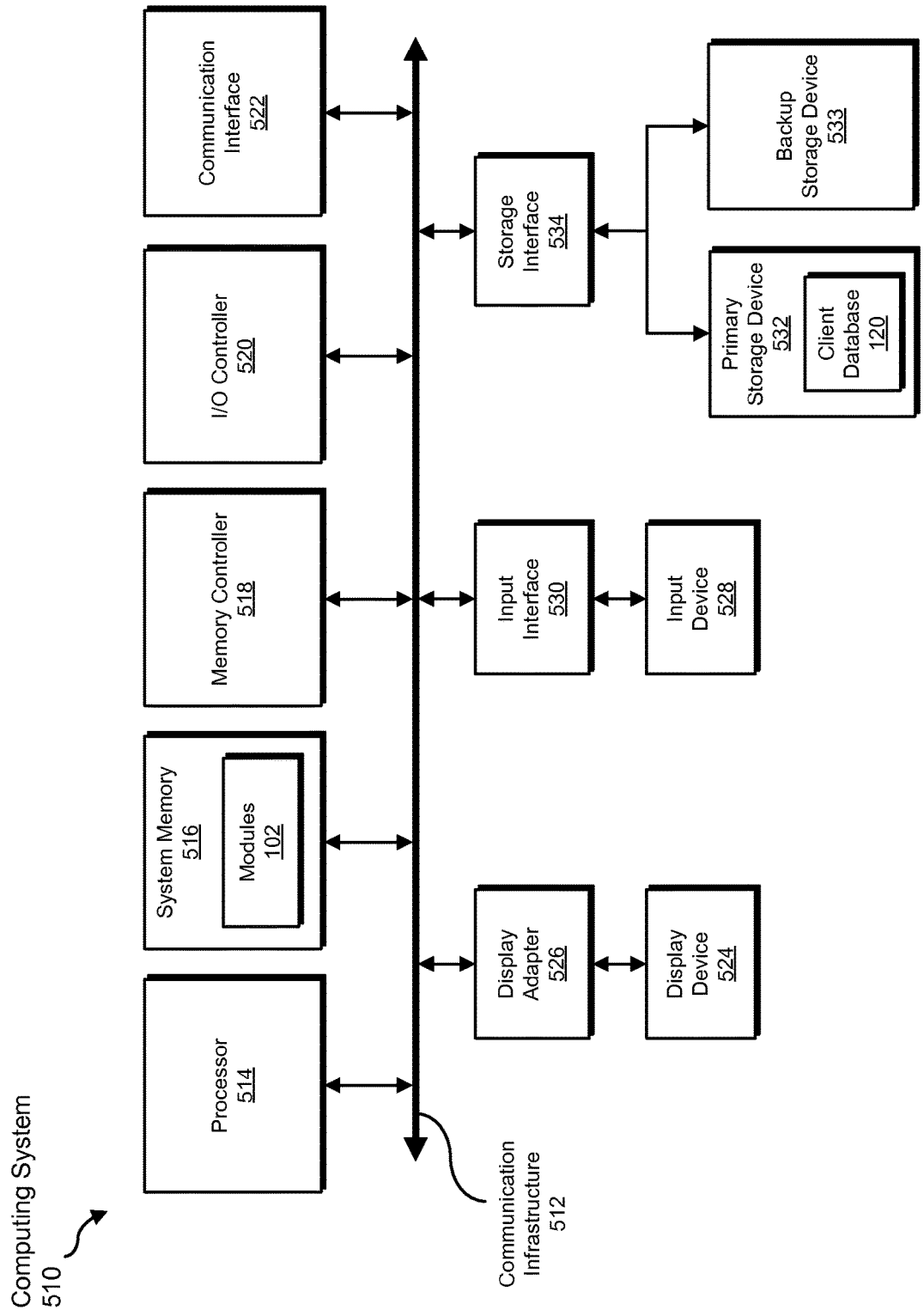
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, client database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
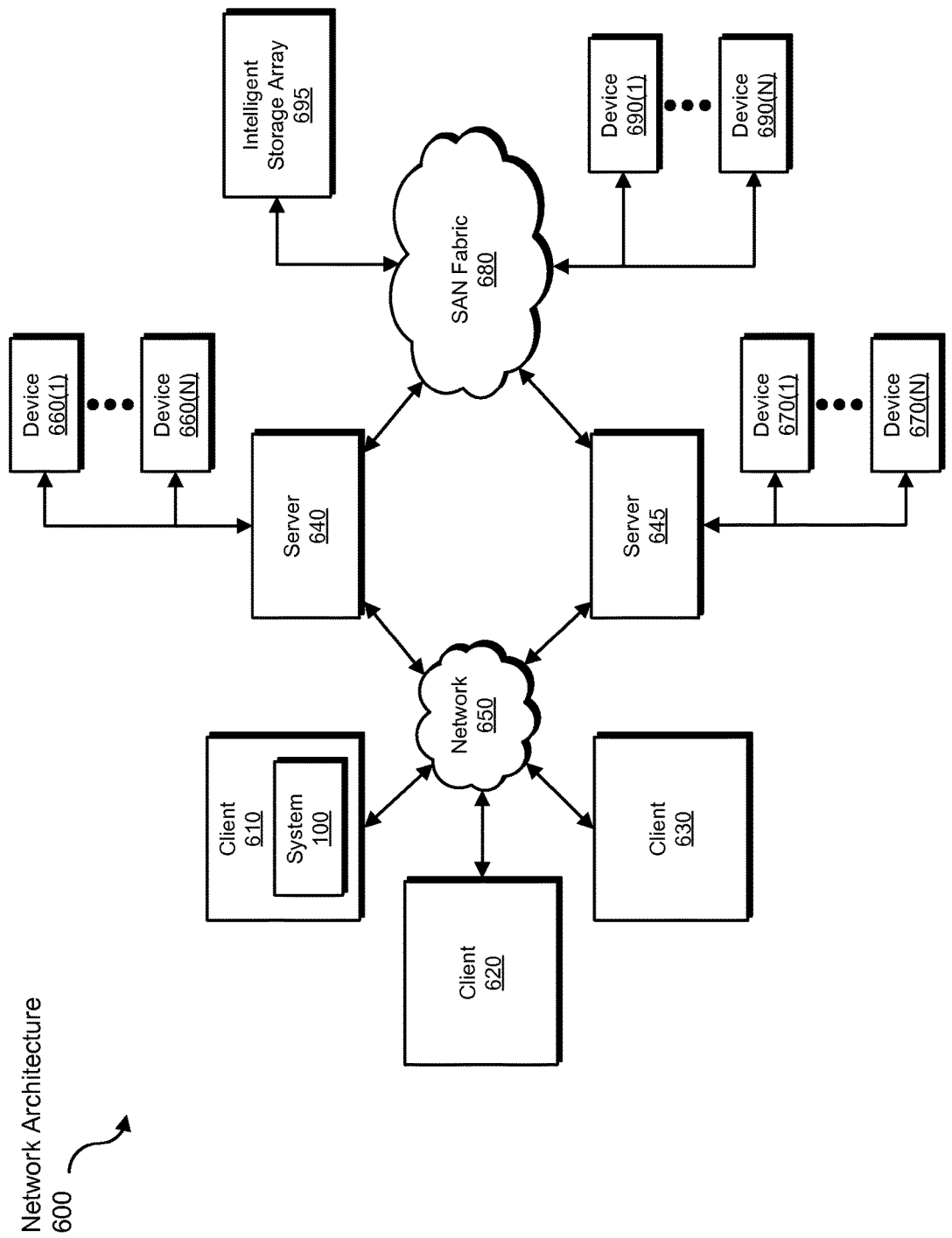
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for detecting system attacks.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive data in the course of an attack on a computing system, transform the data to information about the attack, and use the result of the transformation to determine the source of the attack and an appropriate response. Modules described herein may also transform a physical computing system into a system for detecting system attacks. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for cooperatively detecting infections on remote computing systems running cooperative anti-malware agents, at least a portion of the method being performed by a computing device comprising at least one processor, the method comprising:
   determining, via a first instance of an anti-malware agent installed on a client system, that the client system is under attack;
   identifying, via the first instance of the anti-malware agent, a compromised client system from which the attack originated;
   in response to identifying the compromised client system from which the attack originated, determining, via the first instance of the anti-malware agent and without the use of a backend server, that the compromised client system includes a second instance of the anti-malware agent by:
      querying the compromised client system directly to determine whether the compromised client system includes the second instance of the anti-malware agent;
      receiving, from the compromised client system, an indication that the compromised client system includes the second instance of the anti-malware agent;
   in response to determining that the compromised client system includes the second instance of the anti-malware agent, notifying, from the first instance of the anti-malware agent, the second instance of the anti-malware agent that the compromised client system performed the attack.

2. The computer-implemented method of claim 1, wherein determining that the client system is under attack comprises at least one of:
   identifying a file suspected of including malware;
   identifying a behavior suspected to be malicious.

3. The computer-implemented method of claim 2, wherein notifying the second instance of the anti-malware agent that the compromised client system performed the attack comprises transmitting, to the second instance of the anti-malware agent, a targeted notification that indicates that an attack originated from the compromised client system.

4. The computer-implemented method of claim 1, wherein determining that the client system is under attack comprises at least one of:
   detecting malicious or unwanted network traffic from the compromised client system;
   detecting an attempt to exploit a known vulnerability of the client system under attack;
   detecting an unauthorized attempt to create a file on the client system under attack;
   detecting an unauthorized attempt to modify an existing file on the client system under attack;

detecting an attempt to modify an executing process of the client system under attack;
detecting an unauthorized attempt to modify a system configuration database on the client system under attack;
detecting an unexpected attempt to execute a software program on the client system under attack;
detecting an unauthorized attempt to access sensitive data on the client system under attack;
detecting an attempt to bypass a security system of the client system under attack;
detecting an attempt to disable a security system of the client system under attack.

5. The computer-implemented method of claim 1, wherein the first instance of the anti-malware agent and the second instance of the anti-malware agent comprise cooperative anti-malware agents from a same software vendor.

6. The computer-implemented method of claim 1, wherein determining that the compromised client system includes a second instance of the anti-malware agent further comprises determining that:
   the compromised client system was successfully attacked by malware that instigated the attack on the client system under attack;
   the malware avoided detection by the second instance of the anti-malware agent.

7. The computer-implemented method of claim 1, wherein notifying the second instance of the anti-malware agent comprises transmitting, to the second instance of the anti-malware agent, at least one of:
   a category of attack that originated from the compromised client system;
   information identifying malware that infected the compromised client system;
   instructions for halting the attack originating from the compromised client system;
   instructions for removing malware that infected the compromised client system;
   instructions to perform an anti-malware scan on the compromised client system;
   instructions for submitting a suspected malware file to an anti-malware service.

8. The computer-implemented method of claim 1, further comprising performing a security action comprising at least one of:
   notifying an administrator that an attack originated from the compromised client system;
   performing a malware scan on the client system under attack;
   instructing an additional computing system in communication with the compromised client system to perform a malware scan of the additional computing system.

9. A system for cooperatively detecting infections on computing systems running cooperative anti-malware agents, the system comprising:
   an identification module stored in memory of a client system, that:
      determines, via a first instance of an anti-malware agent installed on the client system, that the client system is under attack; and
      identifies, via the first instance of the anti-malware agent, a compromised client system from which the attack originated;
   a determination module stored in the memory of the client system under attack, that, in response to the identification module identifying the compromised client system from which the attack originated, determines, via the first instance of the anti-malware agent and without the use of a backend server, that the compromised client system includes a second instance of the anti-malware agent by:
      querying the compromised client system directly to determine whether the compromised client system includes the second instance of the anti-malware agent;
      receiving, from the compromised client system, an indication that the compromised client system includes the second instance of the anti-malware agent;
   a notification module stored in the memory of the client system under attack, that, in response to the determination module determining that the compromised client system includes the second instance of the anti-malware agent, notifies, via the first instance of the anti-malware agent, the second instance of the anti-malware agent that the compromised client system performed the attack;
   at least one physical processor configured to execute at least the identification module, the determination module and the notification module.

10. The system of claim 9, wherein the notification module notifies the second instance of the anti-malware agent that the compromised client system performed the attack by transmitting, to the second instance of the anti-malware agent, a targeted notification that indicates that an attack originated from the compromised client system.

11. The system of claim 10, wherein the first instance of the anti-malware agent and the second instance of the anti-malware agent comprise cooperative anti-malware agents from a same software vendor.

12. The system of claim 9, wherein the identification module identifies the attack by at least one of:
   detecting malicious or unwanted network traffic from the compromised client system;
   detecting an attempt to exploit a known vulnerability of the client system under attack;
   detecting an unauthorized attempt to create a file on the client system under attack;
   detecting an unauthorized attempt to modify an existing file on the client system under attack;
   detecting an attempt to modify an executing process of the client system under attack;
   detecting an unauthorized attempt to modify a system configuration database on the client system under attack.

13. The system of claim 9, wherein the identification module identifies the attack by at least one of:
   detecting an unexpected attempt to execute a software program on the client system under attack;
   detecting an unauthorized attempt to access sensitive data on the client system under attack;
   detecting an attempt to bypass a security system of the client system under attack;
   detecting an attempt to disable a security system of the client system under attack.

14. The system of claim 9, wherein the first instance of the anti-malware agent identifies the attack based on information obtained from a network gateway.

15. The system of claim 9, wherein the notification module notifies the second instance of the anti-malware agent by transmitting to the second instance of the anti-malware agent at least one of:
   a category of attack that originated from the compromised client system;

information identifying malware that infected the compromised client system;
instructions for halting the attack originating from the compromised client system;
instructions for removing malware that infected the compromised client system;
instructions to perform an anti-malware scan on the compromised client system;
instructions for submitting a suspected malware file to an anti-malware service.

16. The system of claim 9, further comprising a security module stored in memory of the client system, that performs a security action comprising at least one of:
performing a malware scan on the client system under attack;
instructing an additional computing system in communication with the compromised client system to perform a malware scan of the additional computing system.

17. A non-transitory computer-readable medium comprising one or more computer-readable instructions that, when executed by at least one processor of a computing device, cause the computing device to:
determine, via a first instance of an anti-malware agent installed on a client system, that the client system is under attack;
identify, via the first instance of the anti-malware agent, a compromised client system from which the attack originated;
in response to identifying the compromised client system from which the attack originated, determine, via the first instance of the anti-malware agent and without the use of a backend server, that the compromised client system includes a second instance of the anti-malware agent by:
querying the compromised client system directly to determine whether the compromised client system includes the second instance of the anti-malware agent;
receiving, from the compromised client system, an indication that the compromised client system includes the second instance of the anti-malware agent;
in response to determining that the compromised client system includes the second instance of the anti-malware agent, notify, from the first instance of the anti-malware agent, the second instance of the anti-malware agent that the compromised client system performed the attack.

18. The non-transitory computer-readable medium of claim 17, wherein the first instance of the anti-malware agent and the second instance of the anti-malware agent comprise cooperative anti-malware agents from a same software vendor.

19. The non-transitory computer-readable medium of claim 18, wherein the first instance of the anti-malware agent notifies the second instance of the anti-malware agent that the compromised client system performed the attack by transmitting, to the second instance of the anti-malware agent, a targeted notification that indicates that an attack originated from the compromised client system.

20. The non-transitory computer-readable medium of claim 17, wherein the first instance of the anti-malware agent determines that the client system is under attack by at least one of:
detecting malicious or unexpected network traffic from the compromised client system;
detecting an attempt to exploit a known vulnerability of the client system under attack;
detecting an unauthorized attempt to create a file on the client system under attack;
detecting an unauthorized attempt to modify an existing file on the client system under attack;
detecting an attempt to modify an executing process of the client system under attack;
detecting an unauthorized attempt to modify a system configuration database on the client system under attack;
detecting an unexpected attempt to execute a software program on the client system under attack;
detecting an unauthorized attempt to access sensitive data on the client system under attack;
detecting an attempt to bypass a security system of the client system under attack;
detecting an attempt to disable a security system of the client system under attack.

* * * * *